United States Patent [19]
Wiegmann

[11] 3,759,217
[45] Sept. 18, 1973

[54] APPARATUS FOR IMPREGNATING WOOD WITH SYNTHETIC RESIN
[75] Inventor: Karl H. Wiegmann, Huntingdon Valley, Pa.
[73] Assignee: Hull Corporation, Hatboro, Pa.
[22] Filed: June 5, 1969
[21] Appl. No.: 830,655

[52] U.S. Cl. .................................. 118/5, 118/50
[51] Int. Cl. ............................... B05c 11/14
[58] Field of Search ............................... 118/5, 50

[56] References Cited
UNITED STATES PATENTS
3,613,633 10/1971 Anderson ........................ 118/5
2,721,144 10/1955 Penley ........................ 118/50 X
2,910,959 11/1959 Drom et al. ........................ 118/50
3,233,579 2/1966 Arvidsson ........................ 118/50

*Primary Examiner*—Louis K. Rimrodt
*Attorney*—Oliver D. Olson

[57] ABSTRACT

Pieces of wood in a perforate container in a chamber are evacuated and then immersed in a liquid mixture of monomeric synthetic resin and catalyst under elevated pressure. The container of resin-impregnated wood then is transferred to a rotary chamber and tumbled under elevated gas pressure and controlled polymerization temperature to effect polymerization of the impregnated resin.

10 Claims, 2 Drawing Figures

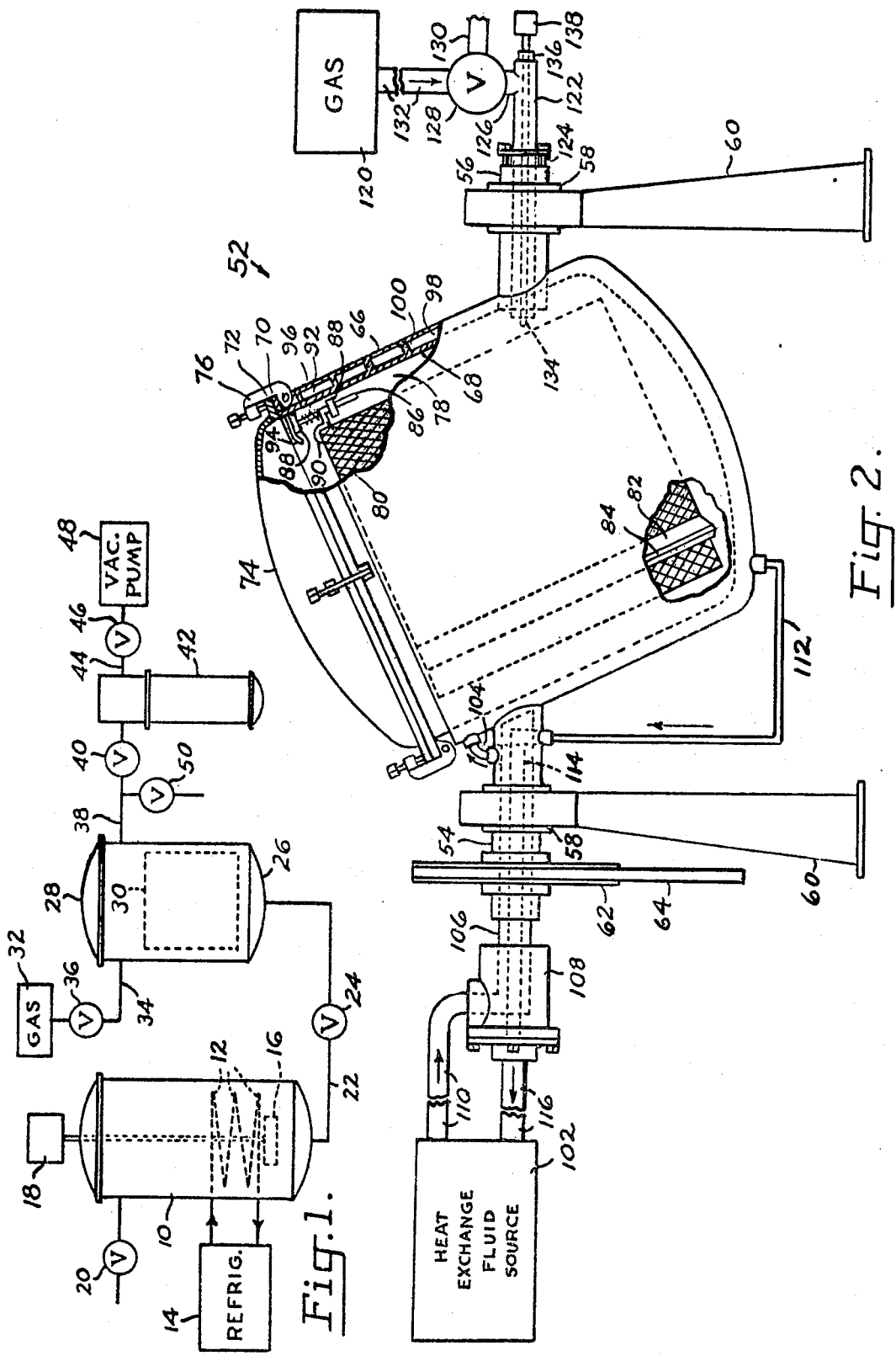

APPARATUS FOR IMPREGNATING WOOD WITH SYNTHETIC RESIN

BACKGROUND OF THE INVENTION

Resin-impregnated wood has been provided heretofore by impregnating the wood with liquid synthetic resin and then heating the pieces of impregnated wood in a stationary oven to effect polymerization. This procedure requires all pieces of wood to be separated in the oven to prevent them from bonding together. Accordingly, large ovens must be provided, at considerable cost, to achieve a practicable level of production. Moreover, this procedure results in distortion or warping of the wood pieces because of the difficulty of maintaining uniform moisture content of the wood during impregnation or polymerization. Resin-impregnated wood also has been provided heretofore by impregnating the wood with liquid synthetic resin and then exposing the impregnated wood to gamma radiation to effect polymerization. This procedure requires very expensive equipment and radioactive material, and also is very hazardous to personnel.

SUMMARY OF THE INVENTION

In its basic concept this invention involves the pressure impregnation of previously evacuated wood pieces with a liquid synthetic resin and then agitating the impregnated wood pieces while simultaneously subjecting them to controlled polymerization temperature to effect polymerization of the resin.

It is by virtue of the foregoing basic concept that the primary objective of this invention is achieved, namely to avoid the above enumerated disadvantages of prior methods and apparatus.

The foregoing and other objects and advantages of this invention will appear from the following detailed description, taken in connection with the accompanying drawing of the preferred embodiment.

BRIEF DESCRIPTION OF THE DRAWING

FIG. 1 is a schematic diagram of resin impregnating apparatus embodying features of this invention.

FIG. 2 is a side elevation, partly in section, of resin polymerization apparatus embodying features of this invention.

DESCRIPTION OF THE PREFERRED EMBODIMENT

Referring first to FIG. 1 of the drawing, there is shown a storage reservoir 10 for a supply of synthetic resin which is to be impregnated into pieces of wood. There are a number of synthetic monomeric resins well known in the art that are suitable for wood impregnation. These include methyl methacrylate, monomers of styrene, t-butyl styrene and others. The preferred resins are those which are capable of producing a hard section of wood without affecting its grain. Resins also may be selected to provide desired colorations.

The monomeric resins generally are mixed with a quantity of catalyst to expedite polymerization, and also a quantity of inhibitor to retard polymerization during storage preliminary to use. Polymerization is further inhibited during storage by maintaining the resin below a predetermined temperature, the latter being dependent upon the type of resin. Accordingly, there is provided in the storage reservoir a passageway, such as the spiral conduit 12 illustrated for the circulation of a heat exchange fluid. Any suitable fluid may be employed. Thus, any conventional refrigerant, an aqueous solution of glycol, or any other suitable fluid, may be circulated through the passageway and through the refrigeration unit 14, to maintain the liquid resin at proper storage temperature. An agitator 16, driven by a mtor 18, also is provided for maintaining uniform temperature throughout the liquid resin. A relief valve 20 also communicates with the reservoir for maintaining proper pressure in the latter.

The bottom of the storage reservoir communicates through the conduit 22 and transfer valve 24 with the bottom of the impregnator chamber 26. This chamber is provided with a removable top 28 which is capable of providing a pressure tight seal, and yet is removable for the passage of a perforate container 30 described more fully hereinafter.

The impregnator chamber communicates with a source 32 of compressed air or other gas under pressure, preferably regulated, through the conduit 34 and control valve 36. The chamber also communicates with a source of vacuum. Thus, the chamber communicates through the conduit 38 and shut-off valve 40, vapor condenser 42, conduit 44 and control valve 46, with the vacuum pump 48. The chamber also communicates with the atmoshphere through relief valve 50.

Referring now to FIG. 2 of the drawing, there is shown a polymerizer tank 52 supported by axially aligned trunnions 54 and 56 journaled for rotation in bearings 58 mounted on the spaced frame members 60. A pulley 62 secured to the trunnion 54 is connected through a drive belt 64 to a source of rotary power (not shown), by which the tank is rotated. Although the longitudinal axis of the tank may be disposed normal to the rotational axis of the trunnions, it is preferred that these axes be disposed at an oblique angle, as illustrated.

The polymerizer tank includes an outer wall 66 and an inner wall 68 spaced inwardly therefrom. The upper, open end of the inner wall is provided with an annular flange 70 for removable sealing engagement of the peripheral flange 72 of the closure cap 74. The flanges are secured together removably by any suitable means, such as the pivoted C-clamps 76 illustrated, whereby the cap may be removed and installed with maximum speed and facility.

The polymerization chamber 78, defined by the space within the inner wall, is adapted to receive removably therein the perforate container 30 utilized in the impregnator tank. The perforate container illustrated is made of wire mesh or other suitably perforated material, and is closed at its bottom end. The open upper end of the container is removably closed by a perforate lid 80 provided with means (not shown) for securing it removably to the container. A plurality of circumferentially spaced, longitudinal spacer members 82 are secured to the outer side of the container. These function to center the container within the impregnator tank and polymerizer tank. The outer longitudinal edges of the spacer members preferably are formed with strips 84 of Teflon to facilitate sliding the container into and out of the tanks.

Means is provided for securing the perforate container 30 within the polymerizer chamber to prevent its movement during rotation of the tank. In the embodiment illustrated, such means comprises a plurality of circumferentially spaced latch members. Each latch member comprises an elongated rod 86 extending slidably through a pair of longitudinally spaced lugs 88 projecting inward from the inner wall 68. Intermediate the lugs a hook member 90 projects from the rod for releasable engagement with the upper end of the container. A coil spring 92 between the hook and upper lug functions to urge the rod and hook resiliently inward, whereby to secure the container resiliently within the chamber. The outer end of the rod is provided with a handle 94 by which it may be pulled upward, against the tension of the spring to release the hook from the container. The rod then may be rotated by the handle to swing the hook outward, clear of the container, so that the latter may be removed from the chamber.

An annular ring 96 at the upper end of the outer wall closes the space between the walls, whereby said space provides a passageway 98 for the circulation of heat exchange fluid. Efficiency of circulation of said fluid is enhanced by the provisions of the spiral baffle 100 disposed in said passageway between the top and bottom ends thereof.

The trunnion 54 is hollow to provide for connection of the passageway 98 to a source 102 of heat exchange fluid. Thus, a conduit 104 communicates at one end with the upper end of the passageway and at its opposite end with a hollow conduit 106 which extends outward through the trunnion. The inner end of the conduit is closed, and the outer end engages a stationary pressure connector 108 and communicates with a feed conduit 110 extending from the outlet of the source 102 of heat exchange fluid.

The return conduit 112 communicates at one end with the bottom end of the passageway 98 and at the opposite end with the conduit 114. This conduit extends outward through the hollow conduit 106 and communicates at its outer end, through the pressure connector 108, with return conduit 116 communicating with the inlet of the source 102 of heat exchange fluid.

As is well known, the stationary pressure connector 108 functions to connect the outlet and return conduits of the source 102 of heat exchange fluid with the conduits 104, 106 and 112, 114 respectively, that rotate with the trunnion 54 and polymerizer tank.

The source 102 of heat exchange fluid preferably is a combination source of refrigerant and heated fluid, such as steam. By this means the temperature of the inner wall 68 of the polymerizer tank may be adjusted over a substantial range below and above the freezing temperature of water.

Means is provided for enhancing the initiation of the polymerization reaction and subsequently for maintaining the proper polymerization temperature. Initially, the impregnated wood taken from the impregnator tank is at a temperture below the optimum temperature of polymerization. Accordingly, it is necessary to elevate the temperature of the wood pieces in the polymerizer tank to an appropriate value, determined by the type of resin. In the case of methyl methacrylate, the optimum polymerization temperature is about 140°F. Upon initiation of the polymerization reaction, which is exothermic, it then is necessary to remove the additional heat generated in order to prevent charring of the wood.

Accordingly, control of polymerization temperature is provided in the embodiment illustrated by communicating the polymerizer chamber 78 with a source 120 of gas under pressure. To this end the trunnion 56 is made hollow for the reception of the conduit 122 freely therethrough. The inner end of the conduit extends through both walls of the polymerizer tank for communication with the chamber 78. Adjacent the outer end of the trunnion, an O-ring or other suitable form of fluid pressure seal 124 is provided between the trunnion and conduit to permit rotation of the trunnion relative to the conduit. The conduit communicates through the conduit 126 and control valve 128 selectively with the exhaust conduit 130 and the conduit 132 communicating with the outlet of the source 120 of gas under pressure.

The gas is admitted under pressure into the polymerizer chamber to function as a heat transfer fluid between wood pieces in the perforate container 30 and the inner wall 68 of the tank. For this purpose the gas may be air, nitrogen, or any one of many other suitable gases.

An elongated thermocouple element 134 extends freely through the hollow conduit 122 with its inner end terminating within the polymerizer chamber 78 adjacent the container 30. The thermocouple element extends outward through a fluid pressure seal 136 at the outer end of the conduit and is connected operatively to a temperature responsive control 138. This control is connected operatively to the source 102 of heat exchange fluid for controlling operation of the latter, as explained more fully hereinafter.

In the operation of the apparatus described hereinbefore, let it be assumed for the purpose of illustration that pieces of wood are to be impregnated with liquid methyl methacrylate resin. Accordingly, a supply of the latter is stored in the reservoir 10 and maintained at a temperature of about 30°F. by the circulation of refrigerant through the passageway 12 and by operation of the agitator 16. The cap 28 of the impregnator tank is removed and perforate container 30 filled with pieces of wood to be impregnated, is installed in the tank. The cap then is sealed to the tank and the shut off valve 40 opened to communicate the interior of the tank with the vacuum pump 48 through the vacuum control valve 46. The tank thus is evacuated down to a pressure of between 1 and 200 mm. of mercury, as determined by the setting of the vacuum control valve, to remove moisture and other volatiles from the cells and other voids in the wood pieces, after which the shut off valve 40 is closed.

The transfer valve 24 now is opened to communicate the bottom of the impregnator tank with the bsttom of the storage rservoir 10. Because of the reduced pressure in the impregnator tank, the liquid resin is forced into the latter. When the level of liquid resin in the impregnator tank reaches a level above the perforate container 30, the transfer valve is closed.

The shut off valve 36 then is opened to communicate the impregnator tank with the source 32 of gas under pressure. This gas may be air, nitrogen, or any other suitable type. The gas thus introduced into the impregnator tank under pressure, for example about 100 psi, serves to pressurize the liquid resin and thus force it into the voids in the wood. Sufficient soak time under such pressure is allowed to insure complete filling of the voids.

The transfer valve 24 now is reopened, whereupon the elevated pressure in the impregnator tank forces the excess liquid resin back into the storage reservoir 10. The transfer valve then is reclosed, the shut off valve 36 is closed and the relief valve 50 is opened to exhaust the impregnator tank to the atmosphere. The cap 28 of the impregnator tank then is removed and the perforate container 30 withdrawn and placed into the chamber 78 of the polymerizer tank (FIG. 2). The locking hooks 90 are engaged over the upper end of the container, by appropriate manipulation of the handles 94, and the cap 74 sealed over the open upper end of the tank by proper manipulation of the clamps 76.

After the cap 74 has been sealed in place, the drive motor (not shown) is energized to drive the belt 64 and rotate the polymerizer tank, for example about 3 rpm. The pieces of wood thus are tumbled in the perforate container 30 continuously to insure against their becoming bonded together during polymerization of the resin.

The control valve 128 now is moved to communicate the source 120 of gas with the polymerizer chamber 78 to fill the latter with gas under pressure, for example about 50–100 psi, after which the control valve is moved to close both conduits 130 and 132 from the conduit 126.

In order to initiate polymerization of the resin impregnated in the pieces of wood contained in the perforate container 30, the temperature in the polymerizer chamber 78 must be elevated to about 140°F. The thermocouple control 138, being set at this temperature, thus effects operation of the source 102 of heat exchange fluid to admit steam or other fluid heated to approximately 170°F., through the outlet conduit 110, thence through the conduits 106 and 104 and into the spiral passageway 98 formed by the baffle 100, thence through the return conduits 112, 114 and 116 back to the source 102. The heated fluid heats the inner wall 68 of the tank, and this heat is conducted through the gas under pressure in the polymerizer chamber to the pieces of wood in the perforate container.

As the polymerization reaction proceeds, the heat liberated by the exothermic reaction causes the temperature of the wood, and hence the gas under pressure in the chamber 78, to rise. This temperature change is detected by the thermocouple control 138 which thereupon functions to adjust the source 102 of heat exchange fluid to circulate cooler heat exchange fluid through the spiral passageway 98. The excess heat of reaction thus is conducted through the gas under pressure and the inner wall 68 of the tank for absorption by the heat exchange fluid. In this manner the optimum polymerization temperature of 140°F. is maintained continually until the polymerization reaction is completed.

Upon completion of the polymerization action, the temperature within the polymerizer chamber 78 is reduced to normal room temperature. The control valve 128 then is moved to exhaust the polymerizer chamber to the atmosphere through the conduit 130. The cap 74 of the tank then is removed, the perforate container 30 withdrawn and its lid 80 detached for removal of the resin-impregnated pieces of wood.

The method and apparatus described hereinbefore function effectively to produce hard, dense pieces of wood which retain their natural color and grain. Because of the initial step of evacuating the impregnator tank, and hence the wood, moisture and occluded gases are removed from the pores and cells of the wood. This insures maintenance of proper moisture content of the wood and also maximum impregnation of resin, while substantially eliminating warping or other distortion of the wood pieces. Maintenance of proper moisture content also is continued during the polymerization action, by the provision of the gas under pressure within the polymerizer chamber. The provision of gas under pressure in the polymerizer chamber also insures maintenance of proper polymerization temperature throughout the reaction, whereby to achieve maximum production without charring or other damage to the wood. By tumbling or otherwise agitating the pieces of wood during polymerization they are prevented from becoming bonded together. This insures the production of impregnated pieces of wood having high quality surface appearance.

It will be apparent to those skilled in the art that various changes may be made in the steps and conditions of the method and in the number, size, shape, type and arrangement of parts of the apparatus described hereinbefore without departing from the spirit of this invention.

Having now described my invention and the manner in which it may be used, I claim:

1. Apparatus for impregnating wood with synthetic resin, comprising
    a. an impregnator chamber adapted to be removably sealed,
    b. a perforate container confined removably in the impregnator chamber and adapted to contain wood pieces to be impregnated,
    c. means selectively communicating the impregnator chamber with and sealing said chamber from a source of vacuum,
    d. means selectively communicating the impregnator chamber with and sealing said chamber from a source of gas under pressure,
    e. a source of liquid synthetic resin,
    f. means selectively communicating the impregnator chamber with and sealing said chamber from said source of resin for delivering resin from said source to said chamber and returning resin from said chamber to said source,
    g. a polymerizer chamber supported for rotation on an axis disposed angularly with respect to the longitudinal axis of the chamber and adapted to be removably sealed for removably containing the perforate container,
    h. passageway means in the polymerizer chamber for the circulation of heat exchange and,
    i. a source of variable temperature heat exchange fluid communicating with the passageway means.

2. The apparatus of claim 1 including temperature responsive control means communicating with the interior of the polymerizer chamber and operatively connected to the source of heat exchange fluid for varying the temperature of the latter to said passageway means.

3. The apparatus of claim 1 wherein the source of variable temperature heat exchange fluid includes a source of refrigerant fluid and a source of elevated temperature fluid.

4. The apparatus of claim 1 including means selectively communicating the polymerizer chamber with and sealing said chamber from a source of gas under pressure for conducting heat between said passageway means and wood in the perforate container.

5. In apparatus for impregnating wood with synthetic resin, a. a polymerizer chamber supported for rotation on an axis disposed angularly with respect to the longitudinal axis of the chamber,
b. a perforate container confined removably in the polymerizer chamber and adapted to contain wood pieces impregnated with resin,
c. passageway means in the polymerizer chamber for the circulation of heat exchange fluid, and
d. a source of variable temperature heat exchange fluid communicating with the passage means.

6. The apparatus of claim 5 including temperature responsive control means communicating with the interior of the polymerizer chamber and operatively connected to the source of heat exchange fluid for varying the temperature of the latter to said passageway means.

7. The apparatus of claim 5 wherein the source of variable temperature heat exchange fluid includes a source of refrigerant fluid and a source of elevated temperature fluid.

8. The apparatus of claim 5 including spacer means between the polymerizer chamber and perforate container for supporting the latter in spaced relation to said chamber.

9. The apparatus of claim 5 including clamp means on the polymerizer chamber releasably engaging the perforate container for securing the latter releasably in said chamber.

10. The apparatus of claim 5 including means selectively communicating the polymerizer chamber with and sealing said chamber from source of gas under pressure for conducting heat between said passageway means and wood in the perforate container.

* * * * *

UNITED STATES PATENT OFFICE
CERTIFICATE OF CORRECTION

Patent No. 3,759,217　　　　　　　　Dated Sept. 18, 1973

Inventor(s) KARL H. WIEGMANN

It is certified that error appears in the above-identified patent and that said Letters Patent are hereby corrected as shown below:

Column 2, line 26, "atmoshphere" should read --atmosphere--.

Column 6, line 49 should read --the circulation of heat exchange fluid, and--.

Column 8, line 14 should read --and sealing said chamber from a source of gas under--.

Signed and sealed this 1st day of January 1974.

(SEAL)
Attest:

EDWARD M. FLETCHER, JR.　　　　　RENE D. TEGTMEYER
Attesting Officer　　　　　　　　Acting Commissioner of Patents